United States Patent [19]

Trouiller et al.

[11] 4,020,452

[45] Apr. 26, 1977

[54] APPARATUS FOR USE IN INVESTIGATING EARTH FORMATIONS

[75] Inventors: Jean-Claude Trouiller, Chaville; Bernard Vivet, Buc, both of France

[73] Assignee: Schlumberger Technology Corporation, New York, N.Y.

[22] Filed: Feb. 18, 1975

[21] Appl. No.: 550,787

Related U.S. Application Data

[63] Continuation of Ser. No. 256,074, May 23, 1972, abandoned.

[30] Foreign Application Priority Data

May 24, 1971 France .............................. 71.18637

[52] U.S. Cl. ............................ 340/17 R; 340/18 R; 181/102
[51] Int. Cl.² .......................................... G01V 1/40
[58] Field of Search ...................... 340/17 R, 18 R; 181/102, 104, 105, 108, 33 A

[56] References Cited

UNITED STATES PATENTS

| | | | |
|---|---|---|---|
| 2,757,358 | 7/1956 | Ely .................................... | 181/102 |
| 3,190,388 | 6/1965 | Moser et al. ........................ | 340/17 |
| 3,191,141 | 6/1965 | Schuster et al. ................... | 340/18 R |
| 3,191,142 | 6/1965 | Lebourg .............................. | 340/17 |
| 3,213,415 | 10/1965 | Moser et al. ...................... | 340/18 R |
| 3,271,733 | 9/1966 | Cubberly, Jr. ..................... | 340/18 R |
| 3,493,921 | 2/1970 | Johns ................................. | 340/17 |

*Primary Examiner*—H.A. Birmiel
*Attorney, Agent, or Firm*—Brumbaugh, Graves, Donohue & Raymond

[57] ABSTRACT

In accordance with an illustrative embodiment of the present invention, there is shown a substantially rigid member having interruptions in the longitudinal continuity of the member to provide tortuous paths for the passage of acoustic energy along the member. A plurality of masses are periodically spaced along the interior of the member and are each mechanically integral with opposite sides of the member at locations chosen to enable the member and masses to cooperate as a mechanical filter. By so doing, the structure made of the member and masses will have good acoustic delay and attenuation characteristics as well as good mechanical characteristics.

18 Claims, 5 Drawing Figures

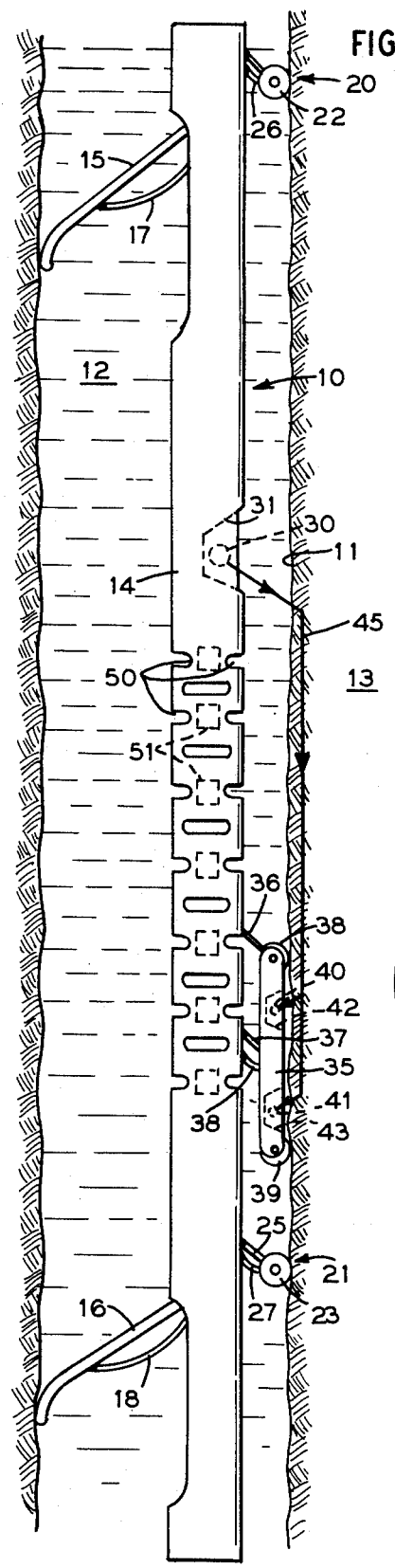
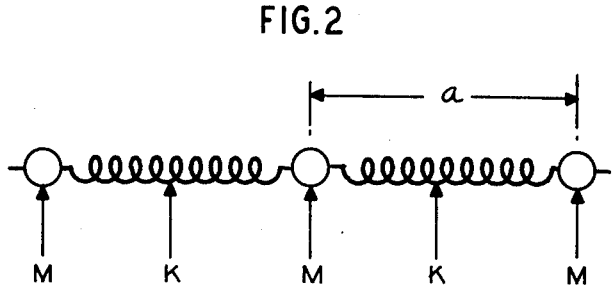
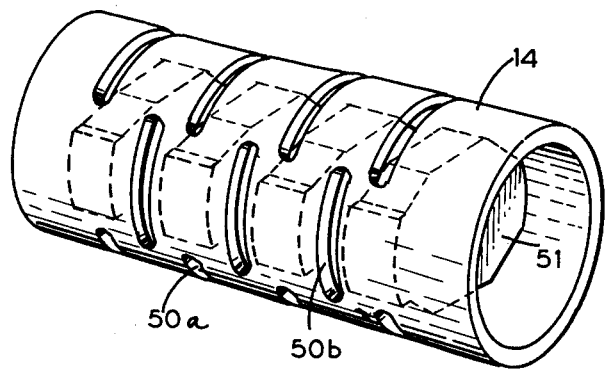
FIG. 1
FIG. 2
FIG. 3

APPARATUS FOR USE IN INVESTIGATING EARTH FORMATIONS

This is a continuation filed of application Ser. No. 256,074 filed May 23, 1972, now abandoned.

BACKGROUND OF THE INVENTION

This invention relates to acoustic well logging apparatus and more particularly to apparatus for attenuating and delaying acoustic energy.

An acoustic well logging apparatus is usually cylindrically shaped and suitably sized for passage through a fluid filled borehole. In the present day form of acoustic well logging apparatus, a transmitter is energized with a pulse of energy to emit acoustic energy into the borehole fluid surrounding the investigating apparatus for passage to the formation surrounding the borehole. The acoustic energy travels through the formation and a portion thereof is detected by one or more nearby acoustic receivers after passing from the formation back into the borehole. In some presently used systems, there are a plurality of acoustic transmitters and receivers.

In the most common type of acoustic logging apparatus, the travel time for acoustic energy to travel between the transmitter and receiver is measured. This is accomplished by generating a pulse which has a known time relationship with the firing of the transmitter and generating a second pulse coincident with the detection of one of the initial half-cycles of the acoustic energy arriving at the receiver. These pulses can then be processed to obtain numerical indications of the travel time between the transmitter and receiver. When makimg such measurements of the travel time of the formation adjoining a borehole, it is imperative that the acoustic energy travelling through the formation arrive at the receiver before the energy travelling through the borehole. Usually the velocity of acoustic energy is significantly less in a borehole fluid than in the formation. However the acoustic velocity in a longitudinal support member constructed of steel will be much greater than in the formations. Of course it would be possible to construct the longitudinal support member of a low velocity material such as rubber but this would severely decrease the mechanical strength and rigidity of the support member and is undesirable for this reason.

This problem has been solved to a large extent by constructing the support member in a manner to delay the acoustic energy. Such a construction is shown in U.S. Pat No. 3,191,141 granted to N. A. Schuster on June 22, 1965. In this Schuster structure, a support member having a generally tubular configuration has a plurality of void or open spaces arranged about the periphery of the tubular member and along its length so as to provide a tortuous path for acoustic energy attempting to pass longitudinally along the support member. This arrangement is particularly useful for delaying acoustic energy at low frequencies. Other apparatus for providing such a delay for acoustic energy can be found in U.S. Pat. No. 3,381,267 granted to W. E. Cubberly, Jr., et al on Apr. 30, 1960; U.S. Pat. No. 3,191,142 granted to Maurice P. Lebourg on June 22, 1965, and U.S. Pat. No. 3,190,388 granted to E. I. Moser et al on June 22, 1965. As stated in the above mentioned patents, this acoustic delay structure will also provide some attenuation of acoustic energy because of the constantly varying shape and size of the acoustic path. As shown in the above-mentioned Moser et al patent, weights can be added to the periphery of this tubular member to enhance this effect.

Another prior-art technique for preventing passage of acoustic energy along the support member has been to construct the support member as a so-called mechanical filter which operates to attenuate acoustic energy above a selected frequency. An example of such construction can be found in U.S. Pat. No. 2,757,358 granted to J. O. Ely on July 31, 1956. In this Ely patent, the support member consists of a plurality of spaced weights connected to one another by a plurality of tubes. While this structure will operate to attenuate high-frequency acoustic energy, there will be a direct path for low-frequency acoustic energy through the tubes such that this low-frequency energy will arrive at the receiver before the acoustic energy which travels through the formations.

It is recognized that a support member of an acoustic logging apparatus should be able to both delay and attenuate acoustic energy travelling longitudinally of the support member. At the same time, the support member should have a significant amount of rigidity and strength because of the harsh downhole conditions to which it will be subjected. Thus in designing such a support member, there are a number of conflicting considerations which must be taken into account. To enhance the delay characteristic of the support member, it would be desirable to provide as many slots as possible therein. However, the more slots that are placed in the support member, the weaker will be the structural characteristics thereof. If a plurality of weights are placed in the skin of the tubular member thus improving its filtering characteristics, its structural characteristics will also be worsened. Thus to provide the required structural characteristics for the support member, it has in the past been necessary to restrict the efficiency of the support member in delaying and attenuating acoustic energy travelling longitudinally of the member.

It is therefore an object of the present invention to provide new and improved acoustic logging apparatus wherein the support member has high-strength qualities and improved attenuation and delay characteristics for minimizing transmission of acoustic energy along the support member.

The above discussion has been concerned with the type of acoustic well logging apparatus wherein the acoustic transducers are mounted on the longitudinally extending support member. In addition to this form of acoustic logging apparatus, it is also possible to mount some or all of the acoustic transducers on a pad member which is pressed against the wall of the borehole for investigating the adjoining formations. Such apparatus can be found in U.S. Pat. No. 3,406,776 granted to L. Henry on Oct. 22, 1963.

In constructing such a pad member, it is sometimes important that it maintain good strength characteristics and have the ability to attenuate or delay acoustic energy travelling along the length of the pad member. One might suggest that the attenuating and delaying structure of the patents discussed above could be applied to such pad structures. However, the small size of the pad member makes this very difficult.

It is therefore another object of the present invention to provide a new and improved pad structure for acoustic well logging apparatus which has high strength characteristics as well as the ability to attenuate acoustic energy.

SUMMARY OF THE INVENTION

In accordance with the present invention, apparatus for attenuating and delaying acoustic energy comprises a substantially rigid member having interruptions in the longitudinal continuity of the wall of the member to provide only tortuous paths for the passage of acoustic energy along the member. The apparatus further comprises a plurality of masses periodically spaced along the interior of the member and arranged such that each mass is mechanically integral with opposite sides of the interior of the member at locations chosen to enable the member and masses to cooperate together as a mechanical low-pass filter. By so doing, most of the acoustic energy attempting to pass through the member will be attenuated and delayed.

For a better understanding of the present invention, together with other and further objects thereof, reference is had to the following description taken in connection with the accompanying drawings, the scope of the invention being pointed out in the appended claims.

BRIEF DESCRIPTION OF THE DRAWINGS

FIG. 1 shows acoustic well logging apparatus constructed in accordance with the present invention;

FIG. 2 is a symbolic representation of a mechanical filter for purposes of explaining its operation;

FIG. 3 is an enlarged view of a portion of the support member shown in FIG. 1 constructed in accordance with one embodiment of the present invention.

DETAILED DESCRIPTION OF THE PREFERRED EMBODIMENTS

Figure 4:
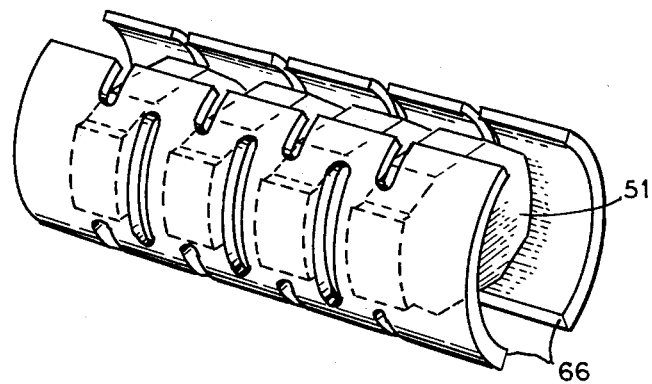
FIGS. 4 and 5 are enlarged views of a portion of the support member of FIG. 1 constructed in accordance with other embodiments of the present invention.

Now referring to FIG. 1, a downhole investigating apparatus 10 is supported in a borehole 11 filled with a suitable drilling mud 12 investigating subsurface earth formations 13. The investigating apparatus 10 includes a longitudinally extending support member 14 which includes upper and lower offcentering arms 15 and 16 which are maintained in an extended position by suitable springs 17 and 18. The arms 15 and 16 can be withdrawn to the side of the support member 14 by suitable hydraulic means (not shown). A pair of standoffs 20 and 21 are provided on the opposite side of the support member 14 from the eccentering arms 15 and 16 for maintaining the support member 14 a fixed distance from the wall of the borehole 11. The standoffs 20 and 21 include rotating wheels 22 and 23 coupled to the support member by linking arms 24 and 25 which are maintained in an extended position by suitable springs 26 and 27. Suitable stop means (not shown) within the support member 14 are provided for limiting the extent to which the standoff means 20 and 21 can be extended outward. Also included within the support member 14 are suitable hydraulics (not shown) for retracting the standoffs 20 and 21.

The investigating apparatus 10 also includes an acoustic transmitter 30 located in a cavity 31 which has an opening to the mud within the borehole. This opening is situated along the same generatrix of the borehole as are the standoffs 20 and 21.

The investigating apparatus 10 also includes a pad member 35 coupled to the support member 14 along the same generatrix as the standoffs 20 and 21 and transmitter 30 by a pair of linkage arms 36 and 37. The pad 35 is maintained in an extended position by a suitable spring 38. suitable hydraulics (not shown) are contained with the support member 14 for retracting the pad 35 to a closed position relative to the support member 14 when desired. The pad member 35 also includes a pair of rotating wheels 38 and 39 which operate to maintain the pad a fixed distance from the borehole wall and also to minimize acoustic noise which might otherwise result from the pad scraping against the borehole wall. The pad member 35 also includes a pair of acoustic receivers 40 and 41 situated in a pair of cavities 42 and 43 respectively. The cavities 42 and 43 have openings toward the borehole wall along the same generatrix as the opening of the cavity 31 for the transmitter 30.

The transmitter 30 and receivers 40 and 41 are desirably cylindrical transducers having their axes parallel to one other and perpendicular to the longitudinal axis of the support member 14. A more detailed explanation of the theory of operation of the acoustic transducers shown in FIG. 1 can be found in copending application Ser. No. 256,075 filed by J. C. Trouiller on May 23, 1972 (now U.S. Pat. No. 3,978,939, issued Sept. 7,1976). For a more detailed explanation of the mechanical construction of the eccentering arms, standoffs and retractable pad, reference is made to copending application Ser. No. 256,107 file by J. Planche on May 23, 1972 (now U.S. Pat. No. 3,795,414, issued Mar. 5, 1974).

In operation, suitable electronic circuitry (not shown) contained within a fluid-tight cartridge in the support member 14 operates to energize the transmitter 30 for emitting acoustic energy into the adjacent formation 13, as represented by the energy ray 45. This energy is detected by the receivers 40 and 41 and converted into electrical signals which are processed by the electronic circuitry within the support member 14 for transmission to the surface of the earth. Typically, the travel time of acoustic energy between the two receivers 40 and 41 will be measured. If desired, another transmitter like the transmitter 30 could be suitably placed on the support member 14 below the pad member 35 and on the same generatrix thereas.

A measurement of acoustic travel time will of course be upset if acoustic energy is allowed to travel along the support member 14 since it will arrive at the receivers 40 and 41 much sooner than the energy travelling through the formation 13. Likewise, the measurement will be upset (although to a lesser extent) if the acoustic energy is allowed to pass through the pad member 35.

To delay the passage of acoustic energy along the length of the support member 14, a plurality of open spaces or slots 50 which each extend longitudinally around a portion of the periphery of the support member 14 are located in a staggered relationship to one another along the length of the support member. As set forth in the above-mentioned Schuster patent, these slots operate to delay the travel of acoustic energy along the length of the support member 14 by providing a tortuous path for such energy. As stated earlier, the number and extent of such are limited by the desire to maintain the strength characteristics of the tubular support member 14. Moreover, by locating a plurality of slots along the periphery of a tubular support member, the constantly varying shape and size along this member will provide a degree of acoustic attenuation.

As stated earlier, it is also possible to construct the support member in the form of a mechanical low-pass filter. Turning now to FIG. 2, there is shown a symbolic representation of such a filter. The weights or masses are represented by the elements M and the portions of the support member between weights are represented by the springs K. This structure of FIG. 2 will operate when subjected to vibrations arising from acoustic energy to provide a virtual low-pass filter having a cutoff frequency $f_o$ such that $$f_c = \frac{1}{\pi}\sqrt{\frac{k}{m}} \qquad (1)$$

where $k$ and $m$ are respectively the return constant stiffness of the springs K and the weight of the masses M. As can be seen from equation (1), the greater is the weight $m$ and the less is the return constant $k$ of the spring, the lower will be the cutoff frequency $f_c$. The optimum condition would be for total attenuation of energy at all frequencies whidh would require the impossible condition that the mass m should be extremely large and/or the spring constant be extremely small.

The slotted delay line construction will be particularly useful for delaying acoustic energy at low frequencies. Moreover, a degree of attenuation will be attained with such a structure. As we have seen, by placing weights or masses in the periphery of such a slotted member acoustic attenuation can be obtained with such a slotted member. Unfortunately, because of very important structural considerations, there is a limit on the amount of weights which can be placed at selected points on the periphery of a member already weakened by slots, thus increasing the cutoff frequency $f_c$. Moreover, the larger the percentage of the slotted support member taken up by slots or void spaces, the weaker will be the support member and the greater the delaying effect. If thus follows that with a lower limit on the mechanical strength of the support member, the cutoff frequency $f_c$ and/or the delaying effect will have to be comprised--perhaps to an undesirable extent in some cases.

In this connection it would be desirable to provide a support member which will have a high degree of mechanical strength and at the same time provide a high degree of delay and attenuation for acoustic energy travelling along the length of the support member. In accordance with one feature of the present invention, this is accomplished by locating a plurality of weights at specified points along the interior of the support member 14 which weights are mechanically integral with opposite sides of the support member. These weights are represented in FIG. 1 by the dotted line elements 51.

Referring now to FIG. 3, there is shown an enlarged view of a portion of the support member 14 over the section which includes the slots 50 and weights 51. As seen in FIG. 3, the slots 50 are located in a staggered fashion around the periphery of the hollow tubular member 14. The weights 51 are attached as by welding to diagonally opposite sides of the tubular member 14 and thus are mechanically integral with opposite sides thereof. This structurally reinforces the support member. Alternatively, the weights 51 and tubular member 14 could be machined from one piece of metal. These weights 51 are connected on each side of the tubular member 14 at a location between the end points of two slots located along a common transverse plane relative to the tubular support member.

As shown in FIG. 4, it is also possible to construct this structure in accordance with the present invention by positioning weights 51 between two semi-circular cradles 66 having slots cut therein.

Figure 5:
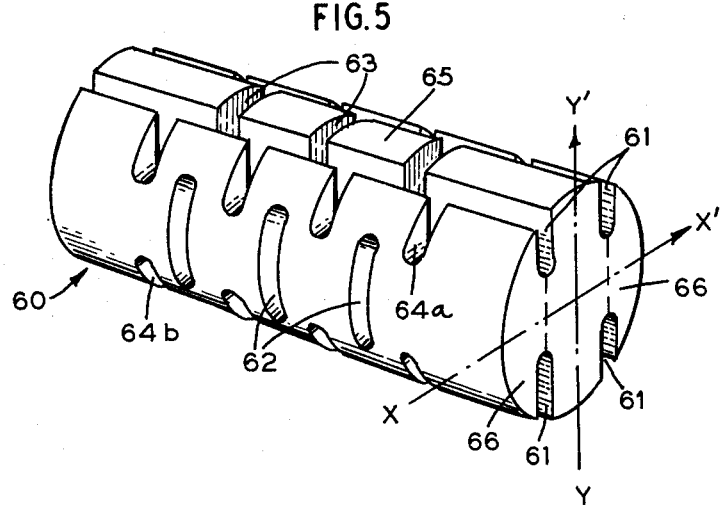

Turning now to FIG. 5, there is shown another embodiment of the present invention. A cylindrical metallic member 60 includes four longitudinally extending grooves 61 arranged along two planes symmetrical with relation to the diameter YY' and parallel thereto. A first series of transverse openings 62 are formed at different points along the length of the member 60 and cut the diameter XX' perpendicular to the diameter YY' in cross-sectional planes of the member 60. These openings 62 extend through the member 60 to the grooves 61. A second series of transverse openings 63 are spaced along a plane defined by the Y-Y' axis and the central longitudinally extending axis of the member 60 between the longitudinal grooves 61 and are located in the same cross-sectional planes as the openings 62. The openings extend completely through the member 60 parallel to the Y-Y' axis. A double series of transverse notches 64a and 64b open into the longitudinal grooves 61 along cross-sectional planes which alternate with the planes containing the transverse openings 62 and 63.

The longitudinal grooves 61 along with the transverse openings 62 and 63 define the limits of a series of masses or weights 65 arranged between cradles 66. The transverse openings 62 and notches 64a and 64b provide the flexible connections between the masses 65, enabling the apparatus to operate as a mechanical low-pass filter. The transverse openings 62, 64a, and 64b along with the notches 61 provide the acoustic delay features of the structure.

It can thus be seen that with the structures shown in FIGS. 3, 4 and 5, a support member having notches cut therein to primarily provide a tortuous path for longitudinal or lengthwise travel of acoustic energy can operate in conjunction with a plurality of masses or weights to provide a mechanical low-pass filter. At the same time, the entire structure can be made very strong mechanically thus enabling the number and extent of the notches or openings which provide the delay characteristics and decrease the spring constant k to be substantially increased.

For structures of the type shown in FIGS. 3, 4 and 5, equation (1) takes the form of:

$$f_c = \frac{1}{\pi}\sqrt{\frac{ES}{ma}} \qquad (2)$$

where E is the modulus of elasticity of the metal, m is the weight of each mass, S is the average section of a connecting spring, and $a$ is the spacing between neighboring masses. Obviously, E and S should be as low as possible and m and a as large as possible to minimize the value of $f_c$. However, S should not be decreased at the expense of mechanical strength.

It would be desirable if a high density material such as tungsten were used for the masses or weights and a material with a low modulus of elasticity such as titanium used in constructing the connecting springs. However, if this is not possible, a compromise material, such as steel, would have to be used for the entire structure. The spacing a should be much less than the wavelength of the acoustic energy in the fluid in which the structure is immersed.

The structures of FIGS. 3, 4 and 5 are shown as tubular in shape. While this is the most desirable shape for such a support member, it is to be understood that the invention is applicable to other shapes as well. For example, the support member could be elliptical or square in shape.

It can thus be seen that with the apparatus of the present invention, an acoustic logging apparatus can be constructed to provide very good structural characteristics coupled with very good attenuation and delay characteristics. In one form of the invention this has been accomplished by providing masses which extend from one side of a slotted support member to the other.

While there has been described what are at present considered to be preferred embodiments of this invention, it will be obvious to those skilled in the art that various changes and modifications may be made therein without departing from the invention, and it is, therefore, intended to cover all such changes and modifications as fall within the true spirit and scope of the invention.

What is claimed is:

1. In apparatus used for investigating earth formations traversed by a borehole, a structure for attenuating and delaying acoustic energy traveling in the structure, comprising:
   a substantially rigid longitudinally extending member having interruptions in the longitudinal continuity of the wall of said member over a given section thereof to provide only tortuous paths for the passage of acoustic energy traveling in said structure and through said section of said member; and
   a plurality of substantially rigid masses periodically spaced along the interior of said section, each such mass being mechanically integral with opposite sides of the interior of said member at locations relative to said interruptions for effectively (1) enabling said interruptions and masses to cooperate as a mechanical low pass filter over said section to attenuate and delay most acoustic energy attempting to pass through said member and (2) contributing to the mechanical strength of said section.

2. The structure of claim 1 wherein said member is tubular shaped over at least a portion of the periphery thereof over said section.

3. The structure of claim 2 wherein said member is tubular shaped over the entire periphery of said member over said section.

4. In apparatus used for investigating earth formations traversed by a borehole, a structure for attenuating and delaying acoustic energy traveling in the structure, comprising:
   a substantially rigid longitudinally extending member having interruptions in the longitudinal continuity of the wall of said member over a given section thereof to provide only tortuous paths for the passage of acoustic energy traveling in said structure and through said section of said member; and
   a plurality of substantially rigid masses periodically spaced along the interior of said section, each such mass being mechanically integral with opposite sides of the interior of said member at locations relative to said interruptions for effectively (1) enabling said interruptions and masses to cooperate as a mechanical low pass filter over said section to attenuate and delay most acoustic energy attempting to pass through said member and (2) contributing to the mechanical strength of said section, wherein said member is tubular shaped over at least a portion of the periphery thereof over said section, and wherein said member comprises two semi-cylindrical cradles over said section and each of said plurality of masses is mechanically integral with said two cradles.

5. The structure of claim 1 wherein said masses are welded to said member.

6. In apparatus used for investigating earth formations traversed by a borehole, a structure for attenuating and delaying acoustic energy traveling in the structure, comprising:
   a substantially rigid longitudinally extending member having interruptions in the longitudinal continuity of the wall of said member over a given section thereof to provide only tortuous paths for the passage of acoustic energy traveling in said structure and through said section of said member; and
   a plurality of substantially rigid masses periodically spaced along the interior of said section, each such mass being mechanically integral with opposite sides of the interior of said member at locations relative to said interruptions for effectively (1) enabling said interruptions and masses to cooperate as a mechanical low pass filter over said section to attenuate and delay most acoustic energy attempting to pass through said member and (2) contributing to the mechanical strength of said section, wherein said masses and member are machined from a common piece of metal.

7. The structure of claim 1 wherein said member is made of an approximately cylindrical metallic body having a plurality of grooves extending longitudinally along said body and arranged symmetrically relative to a first axis which cuts transversely through the center of said cylindrical body and which grooves are parallel to said axis, a series of transverse openings extending completely through said cylindrical body between said symmetrical grooves in a direction along said first axis at periodically spaced locations along said cylindrical body, a second series of spaced apart transverse openings located in that portion of the cylindrical body which is intersected by a second axis perpendicular to said first axis.

8. The structure of claim 7 wherein said second series of openings includes a series of transverse openings in the same cross sectional planes as said first series of openings and extending through said cylindrical body on each side to said corresponding first openings, and a double series of transverse openings on each side of said first axis along cross sectional planes which alternate with said cross sectional planes for said first series of openings, each opening extending through said cylindrical member to one of said grooves.

9. In apparatus for use in investigating earth formations traversed by a borehole, a rigid structure for attenuating and delaying acoustic energy traveling in the structure, comprising:
   a longitudinal member having at least two sides and made of a relatively rigid material having a relatively high modulus of elasticity, said member having interruptions therein in a substantially periodic fashion effective to cause local increases in length to the only longitudinal path for acoustic energy traveling in said member and forming a delay line to delay said acoustic energy, said interruptions also being effective to cause local decreases in the spring constant of said member; and a plurality of substantially rigid masses made of a high density material mechanically coupled to the sides of said member at points intermediate of said substantially periodic interruptions to increase the rigidity of said structure and acoustically coupled to said member in a substantially periodic fashion preserving the continuity of said delay line so that acoustic energy above a given frequecny attempting to pass through said structure will be attenuated.

10. The structure of claim 9 wherein said masses are positioned at points between said interruptions in said member which prevent substantial change in said local decreases in the spring constant of said member.

11. The structure of claim 1 wherein the mechanical integration between said rigid masses and said rigid member includes a coupling capable of transmitting both acoustic and mechanical stresses to provide increased rigidity of the structure.

12. The apparatus of claim 1 wherein at least one of said masses is of a material more dense than the material of said member.

13. In an apparatus including an acoustic transmitter and an acoustic receiver for use in investigating earth formations traversed by a borehole, means connecting said transmitter and receiver for delaying and atenuating the transmission of acoustic energy passing through said connecting means from said transmitter towards said receiver, said connecting means comprising:

a rigid support member having a substantially longitudinal dimension and interruptions therein, interruptions in one plane transverse to the longitudinal dimensions of said member being offset with respect to interruptions in other transverse planes to increase the length of the only longitudinal paths for acoustic energy traveling in said support member, therefore forming a delay line delaying the longitudinal transmission of substantially all acoustic energy traveling in said support member from said transmitter towards said receiver; and at least one weight positioned between said interruptions in diffreint transverse planes and coupled to said rigid support member at points between two additional interruptions in an intermediate transverse plane to cooperate with said interruptions to provide a mechanical filter for acoustic energy traveling in said support member and to cooperate with said support member to provide a rigid mechanical support to increase the rigidity of said support member, said weight and said two of said interruptions lying in a common plane which extends tranversely relative to said member.

14. In an apparatus for use in investigating earth formations traversed by a borehole, an acoustic transmitter, at least one acoustic receiver spaced apart therefrom, and a rigid support for delaying and attenuating the transmission of acoustic energy passing from said transmitter through said rigid support towards said receiver, comprising:

a rigid member having a substantially longitudinal dimension and interruptions therein forming a delay line in at least a section thereof extending between said transmitter and said receiver to increase the longitudinal path length of all acoustic energy traveling in said support, therefore delaying the longitudinal transmission of acoustic energy in said support between said transmitter and said receiver; and at least one rigid weight coupled to said rigid member between said interruptions and cooperatively arranged with said rigid member to function both as a mechanical filter for acoustic energy traveling in said support member and as a rigid mechanical support increasing the rigidity of said support member, said delay line being substantially continuous between said transmitter and said receiver.

15. A support member for use in borehole well logging to provide a rigid structure for both decreasing the velocity and increasing the attenuation of acoustic energy traveling therein, comprising:

a rigid member having at least two substantially longitudinal paths therein for the transmission of acoustic energy;

elongations in said longitudinal paths to provide a delay line in which there are only tortuous paths for the passage of acoustic energy traveling therein which delay the transmission of said energy by increasing the length of said longitudinal path and therefore decrease the effective longitudinal velocity for acoustic energy traveling in said rigid member; and substantially rigid weights coupled to said rigid member at points in said longitudinal paths between said elongations, the combination of said elongations and coupled weights cooperatively arranged to act as a mechanical filter for acoustic energy traveling in the rigid member while said rigid weights increase the rigidity of said member, said mechanical filter being substantially coextensive with said delay line.

16. The support member of claim 15 wherein said coupling between said weights and said rigid member is capable of transmitting both acoustic and mechanical stresses.

17. The support member of claim 16 wherein said elongations in said longitudinal path and weights coupled therebetween are periodically spaced along the longitudinal dimension of said rigid member.

18. The support member of claim 17 wherein at least one of said weights is of a material more dense than the material of said member.

* * * * *

UNITED STATES PATENT AND TRADEMARK OFFICE
CERTIFICATE OF CORRECTION

PATENT NO. : 4,020,452
DATED : April 26, 1977
INVENTOR(S) : Jean-Claude Trouiller and Bernard Vivet It is certified that error appears in the above-identified patent and that said Letters Patent are hereby corrected as shown below:

On the Cover Page, after [56] References Cited, "Schuster et al." should read -- Schuster --; Col. 1, line 4, after "continuation" delete -- filed --; Col. 1, lines 33-34, "makimg" should read -- making --; Col. 1, line 62, "1960" should read -- 1968 --; Col. 2, line 57, "1963" should read -- 1968 --; Col. 3, line 41, after "mud 12" should be -- for --; Col. 4, line 4, "suitable" should read -- Suitable --; Col. 4, line 29, "file" should read -- filed --; Col. 5, line 12, "$f_g$" should read -- $f_c$ --; Col. 5, line 24, "whidh" should read -- which --; Col. 6, line 63, "a" should read -- a --; Col. 7, line 4, "a" should read -- a --; Col. 9, line 15, "frequecny" should read -- frequency --; Col. 10, line 54, "path" should read -- paths --.

Signed and Sealed this twenty-third Day of August 1977

[SEAL]

Attest:

RUTH C. MASON
Attesting Officer

C. MARSHALL DANN
Commissioner of Patents and Trademarks